United States Patent [19]

Brademeyer

[11] Patent Number: 4,498,299
[45] Date of Patent: Feb. 12, 1985

[54] VALVE ASSEMBLY
[75] Inventor: David L. Brademeyer, Centerville, Ohio
[73] Assignee: General Motors Corporation, Detroit, Mich.
[21] Appl. No.: 526,668
[22] Filed: Aug. 26, 1983
[51] Int. Cl.³ .............................................. B60T 11/08
[52] U.S. Cl. ........................................ 60/562; 60/578; 60/588; 137/493; 137/855
[58] Field of Search ............... 60/574, 578, 562, 588, 60/592; 137/493, 493.7, 493.8, 854, 855

[56] References Cited
U.S. PATENT DOCUMENTS 2,571,893  10/1951  Kendall ............................... 137/854
2,580,851   1/1952  Seppmann ......................... 137/493.8
2,624,414   1/1953  Harrell et al. ..................... 137/855
4,208,881   6/1980  Brademeyer et al. .............. 60/592
4,373,333   2/1983  Coleman ............................. 60/578
4,445,333   7/1981  Coleman ............................. 60/578
4,445,334   8/1981  Derrick ............................... 60/578

Primary Examiner—Robert E. Garrett
Assistant Examiner—Scott L. Moritz
Attorney, Agent, or Firm—D. D. McGraw

[57] ABSTRACT

A compensation control and blow-off valve unit in a quick take-up master cylinder. In one embodiment, a stamped valve body forms a valve member within a valve chamber which permits compensation flow from the master cylinder reservoir to the pressurizing chambers. It has an O-ring seal controlling a passage from the valve chamber to the reservoir which opens the passage at a predetermined quick take-up pressure to return fluid to the reservoir. Other embodiments use an umbrella valve or a spring biased ball check valve. The valve housing in some embodiments also retains the reservoir housing in sealed position on the master cylinder housing.

8 Claims, 5 Drawing Figures

VALVE ASSEMBLY

The invention relates to a quick take-up master cylinder and more particularly to one having a compensation control and blow-off valve unit.

A master cylinder embodying the invention utilizes a blow-off valve which permits the buildup of quick take-up pressure to a predetermined point after which the quick take-up chamber is connected to the master cylinder reservoir and the blow-off pressure reduces to substantially, for example, to approximately one-half of its original value. This reduces the portion of the master cylinder actuating force required during the remainder of the stroke to force fluid in the quick take-up chamber through the blow-off valve. Similar arrangements in the subjects of U.S. Pat. No. 4,208,881, issued June 24, 1980; and U.S. patent application Ser. No. 284,062, now U.S. Pat. No. 4,445,333, issued May 1, 1984 and filed July 16, 1981 and entitled "Valve Assembly"; over which the invention herein disclosed and claimed is an improvement. The disclosures of this patent and this application are incorporated herein by reference.

The blow-off valve assembly of U.S. Pat. No. 4,208,881 has a two-part valve housing formed by a valve seat member and a valve body, a ball check valve and spring, and a cup seal which is somewhat intricately constructed to also act as a seal between the seat member and the body, assisting in joining the two together. The structure disclosed and claimed in the above noted U.S. patent application Ser. No. 284,062 is directed to a one-piece stamped element replacing the ball and spring and eliminates the need for a valve seat member separate from the body. The valve chamber required in the structure of the above noted patent is not within the interior of the unit, and much simplification is obtained. The bypass passage is formed as a part of the valve member, which is a part of the one-piece stamped element. A similar cup seal is used. In both of the above noted disclosures, the reservoir housing is fastened to the master cylinder body by means independent of the valve unit.

The quick take-up master cylinder takes up excessive pedal travel by use of a two-stage bore and piston arrangement. It permits the use of increased brake lining clearances, particularly in disc brakes, thus improving gas mileage. It reduces brake pedal effort to manually actuate brakes by using a smaller master cylinder bore diameter for generating high braking pressures after the brake linings have engaged the brake discs or drums. This can remove the requirement of power brake boosters for some cars.

The master cylinder has a stepped bore and a stepped piston defining a large volume chamber and a smaller volume chamber. The large chamber is effective at the beginning of the stroke and in the lower pressure range. It displaces a large volume of fluid at relatively low pressure, which takes up brake lining clearances with a relatively small amount of brake pedal travel. Brake fluid is forced from the large volume or quick take-up chamber around the lip of the primary piston seal into the high pressure chamber as the stroke of the master cylinder piston increases in the brake apply direction. Fluid pressure builds up in the quick take-up chamber to a point that causes the blow-off valve to open and permit passage of substantial quantities of fluid from the quick take-up chamber to the master cylinder reservoir. During the return stroke of the master cylinder piston, excess fluid that has passed from the quick take-up chamber is restored by the flow of fluid from the reservoir around the lip of a compensating seal valve. The blow-off valve is held in the closed position when the master cylinder is in the fully released or at-rest position, but a bypass orifice permits limited passage of brake fluid from the high pressure chamber and the quick take-up chamber into the master cylinder reservoir. Such passage may occur due to temperature changes of the brake fluid or parts of the brake system, for example, providing for delayed pressure equalization.

In one embodiment of the invention, a valve housing receives a stamped valve body, the valve of which permits compensation flow from the reservoir to the master cylinder chambers. It also has a check valve composed of an O-ring seal covering one or more openings in the valve housing and permitting flow from the master cylinder chambers to the reservoir. Other embodiments provide a combined valve housing arrangement with the control valves having similar functions. The valve housing also attaches the reservoir housing to the master cylinder housing. This simplifies the molding construction of the reservoir housing and the assembly operation. The valve permitting flow from the reservoir to the master cylinder chambers may be a spring biased check valve held within the valve housing or an umbrella type check valve, by way of illustrated example. It also uses a check valve arrangement opening to permit fluid flow back to the reservoir. A cantilever spring type check valve for this purpose is illustrated. Alternatively the O-ring valve arrangement of the first noted embodiment may be used.

IN THE DRAWING

Figure 1:
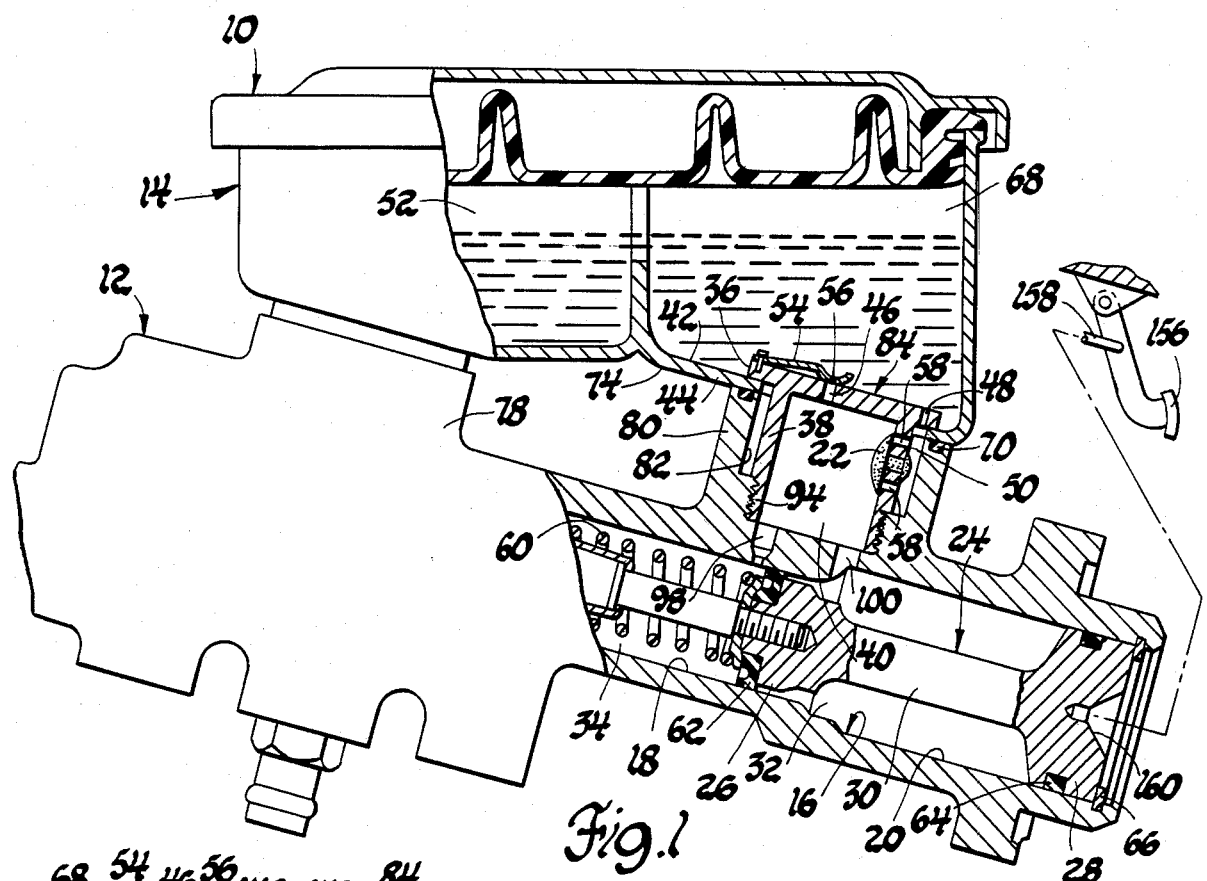
FIG. 1 is a side view of a master cylinder embodying the invention, with parts broken away and in section. The master cylinder is illustrated as being in the fully released position.

The master cylinder assembly 10 includes a housing 12 and a reservoir body 14. The housing has a stepped bore 16 formed therein with a smaller diameter forward section 18 and a larger diameter rear section 20. Since the master cylinder is shown as being of the dual circuit type, it is provided with two pressurizing pistons. The forward piston (not shown) is the secondary piston and is reciprocably received in the forward portion of bore section 18. The rear piston 24 is the primary piston and is a stepped piston. It has a forward piston head 26 formed as a piston land and reciprocably received in the rear portion of bore section 18. It has a rear piston head 28 formed as a land and reciprocably received in bore section 20. The piston heads 26 and 28 are joined by a reduced diameter section 30.

Piston 24 cooperates with bore 16 to define a high volume or quick take-up chamber 32 between piston heads 26 and 28. A rear high pressure pressurizing chamber 34 is defined by the rear part of bore section 18, piston head 26, and the rear end of the secondary piston. A forward high pressurizing chamber (not shown) is defined by the forward end of the secondary piston and the forward end of bore section 18. Outlets are provided in housing 12 to deliver brake fluid pressurized in the high pressure pressurizing chambers to separate brake circuits as is well known in the art. The brake fluid reservoir chamber 52 is connected through compensation ports in boss 78 to bore section 18 to provide communication between the forward high pressure pressurizing chamber and reservoir chamber 52. A piston return spring 60 in chamber 34 continually urges piston 24 toward the released position. Spring 60 is a caged spring, as is well known in the art, which when extended to its permissible limit also establishes the release position of the secondary piston.

A cup seal 62 is mounted on the forward side of piston head 26 of primary piston 24. Seal 62 is arranged to prevent fluid flow from pressurizing chamber 34 to quick take-up chamber 32, while acting as a check valve which permits fluid flow from chamber 32 to chamber 34 around the outer periphery of piston head 26 and the lip of cup seal 62 while pressure in chamber 32 is greater than pressure in chamber 34. A seal 64 is mounted on piston head 28 to seal the rear end of chamber 32. A piston stop 66 is provided in the open end of the enlarged bore section 20 and forms an abutment engaged by piston head 28 when the master cylinder is in the fully released position.

The reservoir body 14, in addition to fluid chamber 52 for the forward pressurizing chamber, has a fluid chamber 68 for the pressurizing chambers 32 and 34. In the arrangement shown in FIG. 3, the reservoir body is secured to the master cylinder housing by use of annular retaining and sealing means 72 which cooperate with short mounting tube 76 formed as a part of reservoir body 14. The retaining and sealing means 72 and the mounting tube 76 and similar devices associated with chamber 52 are respectively received in annular bosses 80 and 78 formed as a part of housing 12.

Figure 3:
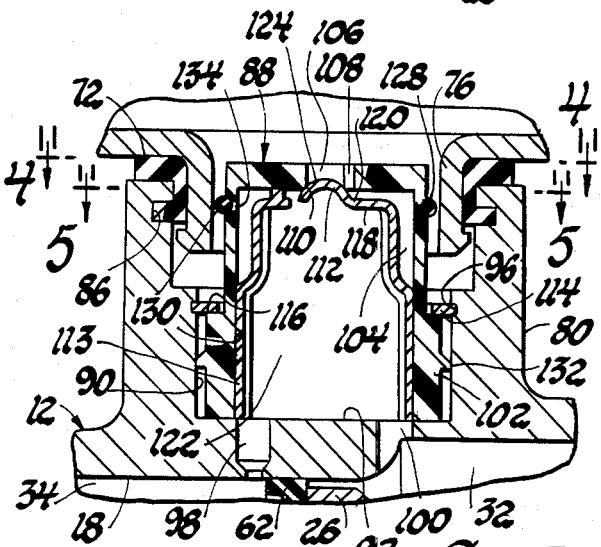
FIG. 3 is similar to FIG. 2, and shows another modification of the compensation control and blow-off unit.
Figure 4:
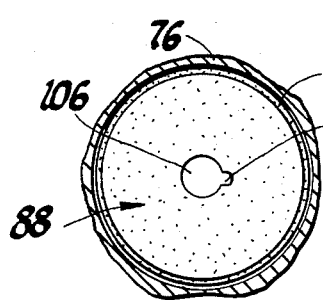
FIG. 4 is a fragmentary cross-section view of the unit of FIG. 3, taken in the direction of arrows 4—4 of that Figure.
Figure 5:
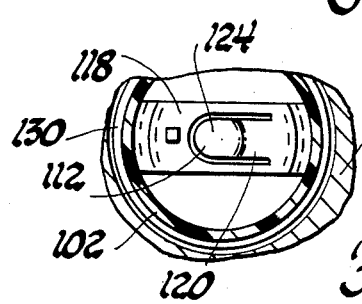
FIG. 5 is a fragmentary cross-section view of the unit of FIG. 3, taken in the direction of arrows 5—5 of that Figure.

Boss 80 of FIG. 3 has a recess 86 which receives retaining and sealing means 72 and mounting tube 76. The recess 86 is also a valve unit chamber receiving the compensation control and blow-off valve unit 88. The lower portion of recess 86 forming the valve unit chamber has a side wall 90, a bottom surface 92 and an annular groove 96. Compensation port 98 is formed through bottom surface 92 and opens into the rear end of bore section 18. It is so positioned relative to the fully released position of cup seal 62 that it opens into pressurizing chamber 34, but is closed during the initial brake apply movement of piston 24 by the lip of cup seal 62. Compensation port 100 extends through bottom surface 92 and into the larger diameter quick take-up chamber 32.

The boss 80 of the arrangement shown in FIG. 1 is somewhat similarly constructed. It has a recess 82 which is also a valve unit chamber receiving the compensation control and blow-off valve unit 84. Compensation ports 98 and 100 are provided in the same manner as those shown in FIG. 3. The valve unit 84 is threaded at its lower end 94 into the bottom portion of recess 82. The valve unit has a flanged cap 36 attached to or formed as a part of a cylindrical portion 38 at the opposite end from threaded end 94 so that it provides an end cover for the chamber 40 contained within the valve unit. The flange of cap 36 engages the top side 42 of the bottom 44 of reservoir chamber 68 and the valve unit extends through an opening in the reservoir bottom. The valve unit is tightened to secure the reservoir in position on boss 80, with a seal 70 provided in a groove in the upper end of boss 80, sealing against the lower side 74 of reservoir bottom 44. An opening 46 provided in the center portion of flanged cap 36 provides communication between fluid reservoir chamber 68 and chamber 40 inside the valve unit. The outer portion of the flange of cap 36 has an opening 48 which opens into an annular chamber 50 defined by the outer wall of the valve unit cylindrical portion 38 and the portion of recess 32 above the threaded portion receiving threaded end 94. A spring loaded valve 54 is suitably attached to flange 36 and cooperates with opening 46 to substantially close that opening while permitting fluid pressure within chamber 40 to move the valve so as to permit a greater flow rate through opening 46 under certain circumstances. Valve 54 is provided with a small orifice 56 fitting over opening 46 to provide a controlled leak which accommodates a delayed pressure equalization between the reservoir chamber 68 and the quick take-up chamber 32 under a static pressure condition. The cylindrical portion 38 of valve unit 84 has one or more openings 58 therethrough connecting chambers 40 and 50. An umbrella type check valve 22 fits over openings 58 on the side of chamber 40 so as to permit flow from chamber 50 to chamber 40 but prevent flow from chamber 40 through openings 58 to chamber 50.

Unit 88 of FIG. 3 includes a recessed valve housing 102 having a chamber 104 formed therein and passage 106 formed axially through the top of the valve body. Passage 106 is circular with an offset portion 108 providing a controlled leak to be described. Passage 106 opens into reservoir chamber 68 through mounting tube 76. The lower end of passage 106 defines a valve seat 110. A valve 112 is formed on the generally closed end of a valve body 113 which is generally U-shaped and fits within valve housing 102.

A valve housing and valve retainer 114 is received in groove 96 and engages a shoulder 116 on the valve housing 102. The top of valve body 113 is formed to provide a resiliently yieldably cantilever spring tongue portion 120, and the valve 112 formed on the free end of portion 120. The valve 112 mates in valve closing relation with valve seat 110 to provide a normally closed check valve 124 for the lower end of passage 106. The offset portion 108 of passage 106 provides a restricted flow passage through the top of valve housing 102 and provides a continuously open passage between chamber 122 of housing 102 and the reservoir chamber 68, restrictively bypassing the normally closed valve 124 between the reservoir 68 and the quick take-up chamber 32. Passage portion 108 provides a controlled leak which accommodates a delayed pressure equalization between the reservoir chamber 68 and the quick take-up chamber 32 under a static pressure condition.

Valve 112 has its upper side exposed to fluid in the reservoir chamber 68 and its lower side continuously exposed to fluid in the quick take-up chamber of the master cylinder bore by way of compensation port 100 and chamber 122. A flange 132 is formed around the center part of the valve housing 102 and sealingly mates with side wall 90.

One or more openings 134 are formed through the side wall of valve housing 102 to connect chamber 122 with chamber 68, bypassing valve 124. A groove 128 around the housing 102 has the outer ends of openings 134 opening therethrough. An O-ring seal 130 fits within groove 128 in light tension so that it normally closes openings 134. Fluid may not flow from chamber 68 through passages past seal 130 into chamber 122, but the O-ring seal will act as a valve permitting flow from chamber 122 into chamber 68 when only a small pressure differential exists between those chambers with the higher pressure in chamber 122.

Figure 2:
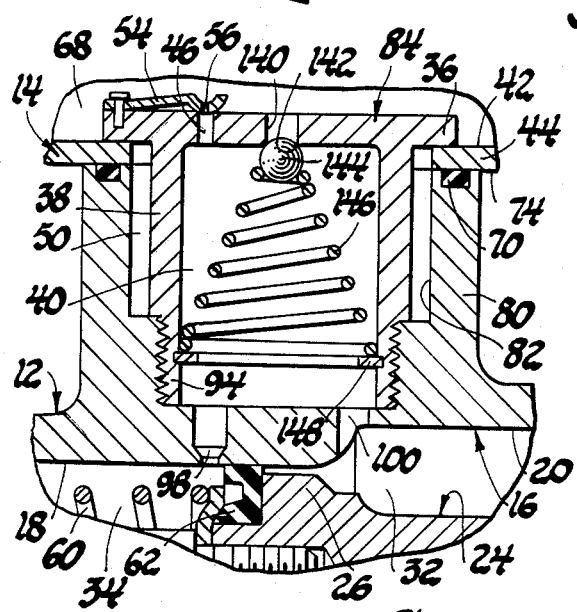
FIG. 2 is an enlarged view of a modification of the compensation control and blow-off unit of the master cylinder of FIG. 1, with parts broken away and in section.

FIG. 2 shows a modified arrangement of the valve mechanism of FIG. 1. It uses the same type of valve unit with the check valve arrangement being somewhat different. Flanged cap 36 has an opening 140 in the center of the cap portion covering chamber 40, the lower end of the opening providing a valve seat 142. A check valve 144 is contained within chamber 40 adjacent valve seat 142 and is normally in engagement with the valve seat. A valve spring 146 in chamber 40 acts on valve 144 to continually urge the valve towards seat 142. A snap ring 148 is positioned in a groove in the lower portion of the valve unit lower end 94 to provide reaction for spring 146. In this arrangement, check valve 144 controls the flow of brake fluid through opening 140 directly from the reservoir chamber 68 through chamber 40 to compensation ports 98 and 100. It prevents any flow through opening 140 in the reverse direction. Opening 46 and valve 54 function in the same manner as shown and described in the arrangement of FIG. 1.

The master cylinder assembly 10 is arranged to be actuated by a vehicle operator through a brake pedal 156 and a push rod 158 which engages the rear end 160 of primary piston 24. Upon initial brake apply movement of piston 24, the volume of quick take-up chamber 32 decreases and fluid is pushed past cup seal 62 into chamber 34. The cup seal 62 moves to close off compensation port 98 so that pressure can be obtained in chamber 34. Since valve member 54 or 112 is seated on its valve seat, fluid flow between quick take-up chamber 32 and reservoir chamber 68 through passage 46 or 106 is substantially prevented, with only a very small flow passing through the orifice-like passage 56 or 108. Thus pressurization of the fluid in chamber 32 can occur in a substantially undiminished manner. Fluid is being replaced from chamber 32 at a relatively large volume but low pressure. It flows past cup seal 62, into chamber 34 and through that chamber's outlet to the brake circuit connected to that outlet. The pressure also acts on the rear end of the secondary piston to move that piston forwardly so that its cup seal closes its compensation port and fluid pressurization begins in its pressurizing chamber, as is well known. Fluid so pressurized goes through the other outlet to the brake circuit connected with that outlet. In a brake system where disc brakes are used on the front vehicle wheels only, the disc brake actuating circuit would be connected to the outlet for chamber 34, thus taking advantage of the high volume of fluid being delivered through that outlet to provide for quick take-up of the brake linings so that they move quickly to engage the brake discs.

The pressure generated in chamber 32 acts on the lower surface of valve member 54 across the effective area at its valve seat, while the upper side of the valve is exposed to reservoir pressure, which is usually substantially atmospheric pressure. In the arrangement of FIG. 3, the pressure generated in chamber 32 acts on O-ring seal valve 130 across the effective area of the end of passage 134. As the pressure in chamber 32 increases, it reaches a point where the pressure differential acting on valve member 54 or 130 overcomes the resilient closing force acting thereon, moving the valve to fully open passage 46 or 134 to reservoir chamber 68, fully communicating quick take-up chamber 32 with reservoir chamber 68. Once the valve member 54 or 130 moves so that it disengages from its valve seat, the pressure from chamber 32 acts on a greater portion of the surface of the valve member, thereby permitting a reduction in pressure in the quick take-up chamber 32 without permitting closure of valve 54 or 130. Valve 54 or 130 will close when the pressure in chamber 32 approaches the pressure in reservoir chamber 68, with passage 56 or 108 providing for minor equalization. Further master cylinder actuation causes pressures to be generated in the primary and secondary pressurizing chambers at a high rate relative to the amount of stroke since the brake circuits no longer require any appreciable fluid volume. The pressurization then depends primarily on the brake force exerted without requiring much brake pedal travel.

Upon brake release, the pressurizing pistons move rightwardly as seen in FIG. 1. Any required compensating fluid for the forward pressurizing chamber will flow through its compensation port from reservoir chamber 52, as is well known. Fluid required for compensation of pressurizing chamber 34 will flow from reservoir chamber 68 through passages 58 and 140 or 106 of FIGS. 1, 2 and 3 respectively, and through chamber 40 or 122 to compensation port 98. The fluid will then flow past cup seal 62 into chamber 34. Fluid flowing through compensation port 100 also flows into quick take-up chamber 32. This chamber requires a relatively large amount of compensating fluid since the volume of chamber 32 increases rapidly upon brake release. The passages and chambers provided are sufficient for this purpose.

As the master cylinder reaches its fully released position, the secondary piston cup seal will open its compensation port so that the forward pressurizing chamber is directly connected to reservoir chamber 52, as is well known. Cup seal 62 will open compensation port 98 so that pressurizing chamber 34 is directly connected to chamber 40 of FIGS. 1 and 2 or chamber 122 of FIG. 3. Any temperature changes requiring fluid compensation after the brakes have been released are readily permitted since both pressurizing chambers have open lines of fluid communication with the reservoir chambers of the reservoir body directly through their associated compensation ports, with compensation port 98 being in fluid communication with reservoir chamber 68 through orifice passage 56 of FIGS. 1 and 2, or passage 108 of FIG. 3.

The embodiments of the invention in which an exclusive property or privilege is claimed are defined as follows:

1. In a quick take-up brake master cylinder assembly having a brake fluid reservoir housing defining a reservoir chamber, a master cylinder housing with a bore therein providing a brake quick take-up pressure generating chamber and at least one brake actuating pressure chamber, fluid compensation ports in said master cylinder housing operatively communicating with said bore and said reservoir chamber, support means formed as a part of said master cylinder housing and providing a mount for said reservoir housing, said support means also having a recess providing fluid access between said quick take-up chamber and said reservoir chamber through at least one of said compensation ports;

a quick take-up fluid pressure and flow control valve assembly comprising:
  a valve housing received in said support means recess and having a generally cylindrical wall portion defining a valve chamber therein, and a cap portion on the upper end of said wall portion, said valve chamber having its lower end openly communicating with said quick take-up chamber through said at least one of said compensation ports;
  at least two passages formed through said valve housing and providing controlled brake fluid communication between said valve chamber and said reservoir chamber;
  and first and second normally closed brake fluid pressure and flow control valves respectively associated with different ones of said at least two passages to control brake fluid flow and pressure therethrough, one of said valves opening at a predetermined increase in brake fluid pressure in said valve chamber generated in said quick take-up chamber and at a pressure value sufficient for brake take-up, the other of said valves opening in response to a decrease in brake fluid pressure in said valve chamber below the brake fluid pressure in said reservoir chamber to permit substantially free brake fluid pressure and flow from said reservoir chamber to said valve chamber and thence to said quick take-up chamber through said at least one of said compensation ports;
said valves each including a movable valve member mounted on and supported by said valve housing and a valve seat means formed by an integral part of said valve housing at the end of each of said associated passages, and yieldable valve biasing means, which may be a part of each of said valve member, continuously urging each of said valve members toward engagement with its valve seat means.

2. In a quick take-up brake master cylinder assembly having a brake fluid reservoir housing defining a reservoir chamber, a master cylinder housing with a bore therein providing a brake quick take-up pressure generating chamber and at least one brake actuating pressure chamber, fluid compensation ports in said master cylinder housing operatively communicating with said bore and said reservoir chamber, support means formed as a part of said master cylinder housing and providing a mount for said reservoir housing, said support means also having a recess providing fluid access between said quick take-up chamber and said reservoir chamber through at least one of said compensation ports;
a quick take-up fluid pressure and flow control valve assembly comprising:
  a valve housing received in said support means recess and having a generally cylindrical wall portion defining a valve chamber therein, and a cap portion on the upper end of said wall portion, said valve chamber having its lower end openly communicating with said quick take-up chamber through said at least one of said compensation ports;
  at least two passages formed through said valve housing and providing controlled brake fluid communication between said valve chamber and said reservoir chamber;
  and first and second normally closed brake fluid pressure and flow control valves respectively associated with different ones of said at least two passages to control brake fluid flow and pressure therethrough, one of said valves opening at a predetermined increase in brake fluid pressure in said valve chamber generated in said quick take-up chamber and at a pressure value sufficient for brake take-up, the other of said valves opening in response to a decrease in brake fluid pressure in said valve chamber below the brake fluid pressure in said reservoir chamber to permit substantially free brake fluid pressure and flow from said reservoir chamber to said valve chamber and thence to said quick take-up chamber through said at least one of said compensation ports;
  said valve housing and said suppory means having mating threads formed thereon, said valve housing being secured to said support means by said mating threads;
said valves each including a movable valve member mounted on and supported by said valve housing and a valve seat means formed by an integral part of said valve housing at the end of each of said associated passages, and yieldable valve biasing means, which may be a part of each of said valve members, continuously urging each of said valve members toward engagement with its valve seat means.

3. In a quick take-up brake master cylinder assembly having a brake fluid reservoir housing defining a resrevoir chamber, a master cylinder housing with a bore therein providing a brake quick take-up pressure generating chamber and at least one brake actuating pressure chamber, fluid compensation ports in said master cylinder housing operatively communicating with said bore and said reservoir chamber, support means formed as a part of said master cylinder housing and providing a mount for said reservoir housing, said support means also having a recess providing fluid access between said quick take-up chamber and said reservoir chamber through at least one of said compensation ports;
a quick take-up fluid pressure and flow control valve assembly comprising:
  a valve housing received in said support means recess and having a generally cylindrical wall portion defining a valve chamber therein, and a cap portion on the upper end of said wall portion, said valve chamber having its lower end openly communicating with said quick take-up chamber through said at least one of said compensation ports;
  at least two passages formed through said valve housing and providing controlled brake fluid communication between said valve chamber and said reservoir chamber;
  and first and second normally closed brake fluid pressure and flow control valves respectively associated with different ones of said at least two passages to control brake fluid flow and pressure therethrough, one of said valves opening at a predetermined increase in brake fluid pressure in said valve chamber generated in said quick take-up chamber and at a pressure value sufficient for brake take-up, the other of said valves opening in response to a decrease in brake fluid pressure in said valve chamber below the brake fluid pressure in said reservoir chamber to permit substantially free brake fluid pressure and flow from said reservoir chamber to said valve chamber and thence to said quick take-up chamber through said at least one of said compensation ports;
  said valve housing and said support means having mating threads formed thereon, said valve housing being secured to said support means by said mating threads;

said valve housing having a flange extending radially outward relative to said generally cylindrical wall portion, said flange operatively engaging said reservoir housing and cooperating with sealing means to seal said reservoir chamber and said support means recess against leakage between said reservoir housing and said support means, said flange being held in operative engagement with said reservoir housing and said support means by said mating threads and holding said reservoir housing and said master cylinder housing in assembled relation;

said valves each including a movable valve member mounted on and supported by said valve housing and a valve seat means formed by an integral part of said valve housing at the end of each of said associated passages, and yieldable valve biasing means, which may be a part of each of said valve members, continuously urging each of said valve members toward engagement with its valve seat means.

4. In a quick take-up brake master cylinder assembly having a brake fluid reservoir housing defining a reservoir chamber, a master cylinder housing with a bore therein providing a brake quick take-up pressure generating chamber and at least one brake actuating pressure chamber, fluid compensation ports in said master cylinder housing operatively communicating with said bore and said reservoir chamber, support means formed as a part of said master cylinder housing and providing a mount for said reservoir housing, said support means also having a recess providing fluid access between said quick take-up chamber and said reservoir chamber through at least one of said compensation ports;

a quick take-up fluid pressure and flow control valve assembly comprising:

a valve housing received in said support means recess and having a generally cylindrical wall portion defining a valve chamber therein, and a cap portion on the upper end of said wall portion, said valve chamber having its lower end openly communicating with said quick take-up chamber through said at least one of said compensation ports;

at least two passages formed through said valve housing and providing controlled brake fluid communication between said valve chamber and said reservoir chamber;

and first and second normally closed brake fluid pressure and flow control valves respectively associated with different ones of said at least two passages to control brake fluid flow and pressure therethrough, one of said valves opening at a predetermined increase in brake fluid pressure in said valve chamber generated in said quick take-up chamber and at a pressure value sufficient for brake take-up, the other of said valves opening in response to a decrease in brake fluid pressure in said valve chamber below the brake fluid pressure in said reservoir chamber to permit substantially free brake fluid pressure and flow from said reservoir chamber to said valve chamber and thence to said quick take-up chamber through said at least one of said compensation ports;

said valves each including a movable valve member mounted on and supported by said valve housing and a valve seat means formed by an integral part of said valve housing at the end of each of said associated passages, one of said valve members being an O-ring seal elastically stretched about said generally cylindrical wall portion, and a grooved valve seat extending circumferentially about said generally cylindrical wall portion and receiving said O-ring seal therein, at least one of said passage means extending from said valve chamber outward through said generally cylindrical wall portion and terminating in the base of said grooved valve seat so that it is closed by said O-ring seal when said O-ring seal is in engagement with said grooved valve seat at said termination, and is opened by pressure in said valve chamber acting therethrough on said O-ring seal to stretch said O-ring seal away from said grooved seat at said passage means termination area.

5. In a quick take-up brake master cylinder assembly having a brake fluid reservoir housing defining a reservoir chamber, a master cylinder housing with a bore therein providing a brake quick take-up pressure generating chamber and at least one brake actuating pressure chamber, fluid compensation ports in said master cylinder housing operatively communicating with said bore and said reservoir chamber, support means formed as a part of said master cylinder housing and providing a mount for said reservoir housing, said support means also having a recess providing fluid access between said quick take-up chamber and said reservoir chamber through at least one of said compensation ports;

a quick take-up fluid pressure and flow control valve assembly comprising:

a valve housing received in said support means recess and having a generally cylindrical wall portion defining a valve chamber therein, and a cap portion on the upper end of said wall portion, said valve chamber having its lower end openly communicating with said quick take-up chamber through said at least one of said compensation ports;

at least two passages formed through said valve housing and providing controlled brake fluid communication between said valve chamber and said reservoir chamber;

and first and second normally closed brake fluid pressure and flow control valves respectively associated with different ones of said at least two passages to control brake fluid flow and pressure therethrough, one of said valves opening at a predetermined increase in brake fluid pressure in said valve chamber generated in said quick take-up chamber and at a pressure value sufficient for brake take-up, the other of said valves opening in response to a decrease in brake fluid pressure in said valve chamber below the brake fluid pressure in said reservoir chamber to permit substantially free brake fluid pressure and flow from said reservoir chamber to said valve chamber and thence to said quick take-up chamber through said at least one of said compensation ports;

said valves each including a movable valve member mounted on and supported by said valve housing and a valve seat means formed by an integral part of said valve housing at the end of each of said associated passages, one of said valve members being an umbrella check valve secured to said valve housing and covering at least one of said passage means so that said at least one of said passage means is closed by said umbrella check valve and held closed by the resilience of said umbrella check valve and is opened by pressure on the opposite side of said valve housing from said umbrella check valve, the valve seat for said umbrella check valve surrounding said at least one of said passage means controlled by said umbrella check valve.

6. In a quick take-up brake master cylinder assembly having a brake fluid reservoir housing defining a reservoir chamber, a master cylinder housing with a bore therein providing a brake quick take-up pressure generating chamber and at least one brake actuating pressure chamber, fluid compensation ports in said master cylinder housing operatively communicating with said bore and said reservoir chamber, support means formed as a part of said master cylinder housing and providing a mount for said reservoir housing, said support means also having a recess providing fluid access between said quick take-up chamber and said reservoir chamber through at least one of said compensation ports;

a quick take-up pressure and flow control valve assembly comprising:

a valve housing received in said support means recess and having a generally cylindrical wall portion defining a valve chamber therein, and a cap portion on the upper end of said wall portion, said valve chamber having its lower end openly communicating with said quick take-up chamber through said at least one of said compensation ports;

at least two passages formed through said valve housing and providing controlled brake fluid communication between said valve chamber and said reservoir chamber;

and first and second normally closed brake fluid pressure and flow control valves respectively associated with different ones of said at least two passages to control brake fluid flow and pressure therethrough, one of said valves opening at a predetermined increase in brake fluid pressure in said valve chamber generated in said quick take-up chamber and at a pressure value sufficient for brake take-up, the other of said valves opening in response to a decrease in brake fluid pressure in said valve chamber below the brake fluid pressure in said reservoir chamber to permit substantially free brake fluid pressure and flow from said reservoir chamber to said valve chamber and thence to said quick take-up chamber through said at least one of said compensation ports;

said valves each including a movable valve member mounted on and supported by said valve housing and a valve seat means formed by an integral part of said valve housing at the end of each of said associated passages, one of said valve members being an O-ring seal elastically stretched about said generally cylindrical wall portion, and a grooved valve seat extending circumferentially about said generally cylindrical wall portion and receiving said O-ring seal therein, at least one of said passage means extending from said valve chamber outward through said generally cylindrical wall portion and terminating in the base of said grooved valve seat so that it is closed by said O-ring seal when said O-ring seal in engagement with said grooved valve seat at said termination, and is open by pressure in said valve chamber acting therethrough on said O-ring seal to stretch said O-ring seal away from said grooved seat at said passage means termination area;

the other of said valves being a unitary valve spring and valve member forming the movable part of said other valve, said valve member being formed on the free end of said cantilevered spring and cooperating with its associated valve seat, one of said valve member and said valve seat having a continuously open restricted flow passage formed therein and bypassing said other of said valves between said reservoir chamber and said valve chamber and providing a controlled leak accommodating a delayed pressure equalization between said reservoir chamber and said valve chamber under static pressure conditions.

7. In a quick take-up brake master cylinder assembly having a brake fluid reservoir housing defining a reservoir chamber, a master cylinder housing with a bore therein providing a brake quick take-up pressure generating chamber and at least one brake actuating pressure chamber, fluid compensation ports in said master cylinder housing operatively communicating with said bore and said reservoir chamber, support means formed as a part of said master cylinder housing and providing a mount for said reservoir housing, said support means also having a recess providing fluid access between said quick take-up chamber and said reservoir chamber through at least one of said compensation ports;

a quick take-up fluid pressure and flow control valve assembly comprising:

a valve housing received in said support means recess and having a generally cylindrical wall portion defining a valve chamber therein, and a cap portion on the upper end of said wall portion, said valve chamber having its lower end openly communicating with said quick take-up chamber through said at least one of said compensation ports;

at least two passages formed through said valve housing and providing controlled brake fluid communication between said valve chamber and said reservoir chamber;

and first and second normally closed brake fluid pressure and flow control valves respectively associated with different ones of said at least two passages to control brake fluid flow and pressure therethrough, one of said valves opening at a predetermined increase in brake fluid pressure in said valve chamber generated in said quick take-up chamber and at a pressure value sufficient for brake take-up, the other of said valves opening in response to a decrease in brake fluid pressure in said valve chamber below the brake fluid pressure in said reservoir chamber to permit substantially free brake fluid pressure and flow from said reservoir chamber to said valve chamber and thence to said quick take-up chamber through said at least one of said compensation ports;

said valves each including a movable valve member mounted on and supported by said valve housing and a valve seat means formed by an integral part of said valve housing at the end of each of said associated passages, one of said valve members being an umbrella check valve secured to said valve housing and covering at least one of said passage means so that said at least one of said passage means is closed by said umbrella check valve and held closed by the resilience of said umbrella check valve and is open by pressure on the opposite side of said valve housing from said umbrella check valve, the valve seat for said umbrella check valve surrounding said at least one of said passage means controlled by said umbrella check valve;

the other of said valves being a unitary valve spring and valve member forming the movable part of said other valve, said valve member being formed on the free end of said cantilevered spring and cooperating with its associated valve seat, one of said valve member and said valve seat having a continuously open restricted flow passage formed therein and bypassing said other of said valves between said reservoir chamber and said valve chamber and providing a controlled leak accommodating a delayed pressure equalization between said reservoir chamber and said valve chamber under static pressure conditions.

8. In a quick take-up brake master cylinder assembly having a brake fluid reservoir, a master cylinder housing with a bore therein providing a brake quick take-up pressure generating chamber and at least one brake actuating pressure chamber, fluid compensation ports in said housing communicating with said bore and said reservoir, support means formed as a part of said housing and providing a mount for said reservoir, said support means also providing fluid access between said quick take-up chamber and said reservoir through at least one of said compensation ports;

a quick take-up fluid pressure and flow control valve assembly comprising:

a valve assembly body defined by an annular generally cylindrical wall body portion secured in said support means and defining a valve chamber therein, said valve chamber having a lower end communicating with said quick take-up chamber through said at least one of said compensation ports, and a generally flat body portion closing the upper end of said valve chamber;

first and second passage means respectively formed through said wall body portion and said flat body portion and providing brake fluid communication between said valve chamber and said reservoir;

a first normally closed brake fluid pressure and flow control valve associated with one of said passage means in one of said body portions and substantially preventing brake fluid pressure and flow from said valve chamber to said reservoir only until a predetermined brake fluid pressure sufficient for brake quick take-up is generated in said quick take-up chamber and said valve chamber;

a second normally closed brake fluid pressure and flow control valve associated with another of said passage means in the other of said body portions and preventing brake fluid pressure and flow from said valve chamber to said reservoir and opening in response to a decrease in brake fluid pressure in said valve chamber below the brake fluid pressure in said reservoir to permit substantially free brake fluid pressure and flow from said reservoir to said valve chamber and thence to said quick take-up chamber through said at least one of said compensation ports.

* * * * *

UNITED STATES PATENT AND TRADEMARK OFFICE
CERTIFICATE OF CORRECTION

PATENT NO.   :   4,498,299
DATED        :   February 12, 1985
INVENTOR(S)  :   David L. Brademeyer It is certified that error appears in the above-identified patent and that said Letters Patent is hereby corrected as shown below:

Column 8, line 12, "suppory" should read -- support --.

Signed and Sealed this

Ninth Day of July 1985

[SEAL]

Attest:

DONALD J. QUIGG

Attesting Officer     Acting Commissioner of Patents and Trademarks